L. BERZON.
SCALE.
APPLICATION FILED JUNE 1, 1916.
1,211,057.   Patented Jan. 2, 1917.
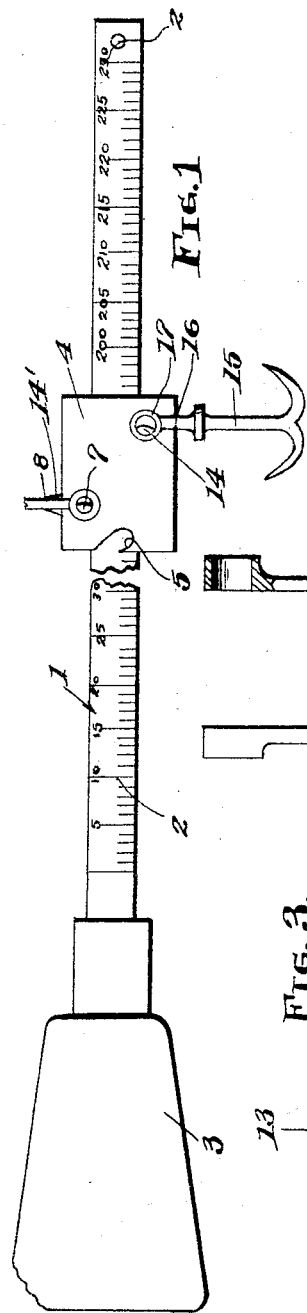
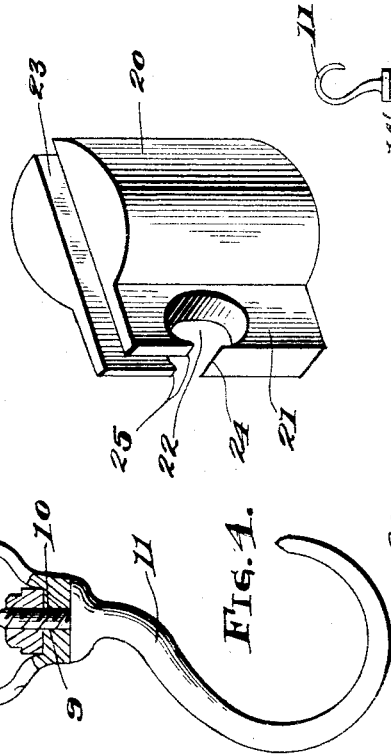
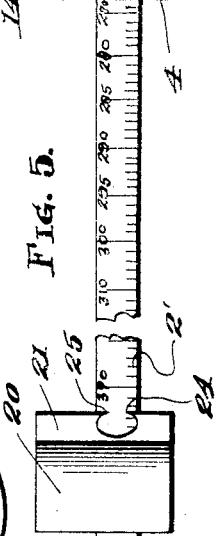
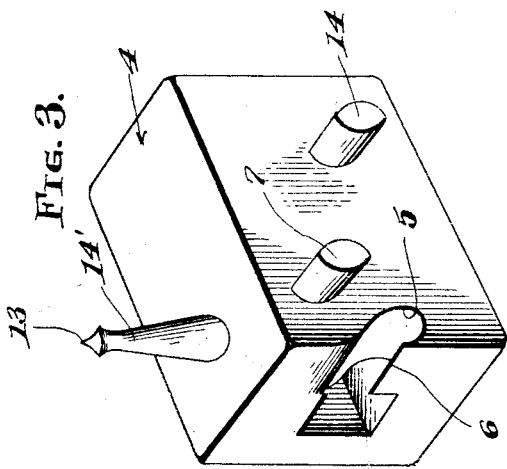
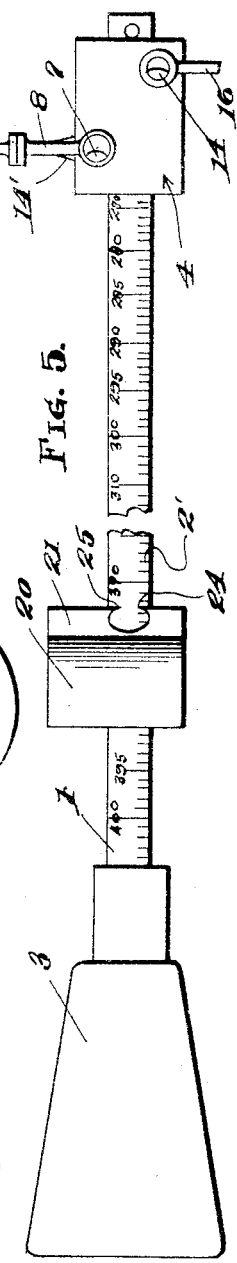
Inventor
L. BERZON.
By
*[signature]*
Attorney

UNITED STATES PATENT OFFICE.

LOUIS BERZON, OF MOUNT VERNON, NEW YORK.

SCALE.

1,211,057.  Specification of Letters Patent.  Patented Jan. 2, 1917.

Application filed June 1, 1916. Serial No. 101,136.

*To all whom it may concern:*

Be it known that I, LOUIS BERZON, a citizen of the United States, residing at Mount Vernon, in the county of Westchester and State of New York, have invented certain new and useful Improvements in Scales; and I do hereby declare the following to be a full, clear, and exact description of the invention, such as will enable others skilled in the art to which it appertains to make and use the same.

This invention relates to improvements in beam scales, and the primary object of the invention is to provide a beam scale structure which includes the scale bar having a weight secured to one end of the same, and a fulcrum block slidably mounted upon the scale bar or beam for coaction with the graduations of the beam for determining the weight of articles, and further to pivotally connect a swiveled hook to the fulcrum block which has a point formed upon the terminal of its shank for coaction with a point carried by the fulcrum block, for indicating when an exact balance is maintained.

A further object of this invention is to provide a removable sliding weight which is adapted for slidable mounting upon the beam between the weight carried by the beam and the fulcrum block, for increasing the weighing scope of the beam scale.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved scale. Fig. 2 is an inverted perspective view of the auxiliary slidable weight. Fig. 3 is a perspective view of the fulcrum block. Fig. 4 is a detail view showing parts in section of the swivelly connected hook which is employed for suspending the beam or scale structure, and Fig. 5 is a side elevation of the scale showing the reverse side to that illustrated in Fig. 1 and also illustrating the application of the auxiliary slidable weight.

Referring more particularly to the drawing, 1 designates the beam of the scale which is provided with the usual type of graduations 2, for indicating pounds of weight. The beam 1 has a balancing weight 3 rigidly secured, in any suitable manner to one end of the same. A fulcrum block 4 is slidably mounted upon the beam 1, and it has a portion of one side thereof cut away as indicated at 5, for forming a point 6 which is adapted for alinement with the various graduations 2. The fulcrum block 4 has trunnions 7 carried thereby which are substantially elliptical in cross section. One of the trunnions 7 project out of each side of the fulcrum block 4 and they are positioned toward the end of the weight provided with a recess 5 and the upper edge of the weight. The trunnions 7 pivotally connect a yoke 8 to the fulcrum block 4, which yoke is connected through the medium of a shank 9 and a nut 10 to a hook 11 which is employed for suspending the scale. The end 12 of the shank 9 is pointed for coaction with the upper pointed end 13 of an indicator 14' which is formed upon and projects upwardly from the upper surface of the fulcrum block 4. When the point 12 of the shank 9 is in alinement with the point 13 of the indicating finger 14', the scale beam 1 is evenly balanced and the weight of the article being weighed may be determined by the position of the edge 6 with relation to the graduations 2. Trunnions 14 which are elliptical-shaped in cross section are also carried by the fulcrum block 4 and they slidably support an article supporting hook 15, which is swivelly connected to a yoke 16. The yoke 16 has rings 17 formed thereon which extend over the trunnions 14.

An auxiliary sliding weight 20 is provided, the body of which is cylindrical in shape. The cylindrical body of the auxiliary slidable weight 20 has a rectangular lug 21 projecting outwardly therefrom which lug is provided with an oval-shaped opening extending transversely therethrough substantially equi-distant of its end as indicated at 22. The body 20 and the lug 21 are cut away as indicated at 23 to form a recess for receiving the beam 1 for slidably mounting the weight 20 upon the beam. The oval-shaped opening 22 communicates with the outer edge of the substantially rectangular-shaped block 21, forming two sharpened edges 24 and 25 which coact with the graduations 2.

For increasing the weighing scope of the beam scale, the fulcrum block 4 is positioned at the outer end of the beam, and the auxiliary slidable weight 20 is positioned between the fulcrum block 4 and the rigid balancing weight 3, and by sliding the weight 20 along the beam an increased weighing scope of the scales may be provided. For example, in a scale which with the single slidable fulcrum block 4 would have a weighing scope of 230 pounds, when the fulcrum block was perched to the outer end of the beam or to the limit of the weighing scope thereof, and the auxiliary weight 20 was mounted upon the beam as heretofore specified, the weighing scope of the scales would be increased to 400 pounds. A pin 26 extends transversely through the outer end of the beam for preventing the fulcrum block 4 from moving off the end of the beam.

In reducing the invention to practice, certain minor features of construction, combination and arrangement of parts may necessitate alteration to which the patentee is entitled provided such alterations are comprehended within the scope of what is claimed.

What is claimed is:—

In a beam scale structure, the combination, of a graduated scale beam, a balancing weight rigidly connected to one end of said beam, a fulcrum block slidably mounted upon said beam, said fulcrum block being provided with a cut out portion for forming a pointed end for coaction with said graduation, substantially elliptical-shaped trunnions carried by and projecting outwardly from the sides of said fulcrum block, a yoke pivotally carried by said trunnions, a suspending hook swivelly connected to said yoke, said suspending hook having a shank, the free end of said shank being pointed, an upstanding pointer carried by said fulcrum block and having its pointed end adapted for coaction with the pointed end of said hook shank for indicating when the scale beam is evenly balanced, a slidable weight slidably mounted upon said beam intermediate said fulcrum block and said balance weight for increasing the weighing scope of the scale.

In testimony whereof I affix my signature in presence of two witnesses.

LOUIS BERZON.

Witnesses:
CHARLES BERZON,
BENNETT S. JONES.

Copies of this patent may be obtained for five cents each, by addressing the "Commissioner of Patents, Washington, D. C."